W. H. MORGAN.
APPARATUS FOR MAKING RAILROAD TIES FROM STEEL RAILS.
APPLICATION FILED JAN. 13, 1910.
968,874.
Patented Aug. 30, 1910.
6 SHEETS—SHEET 1.
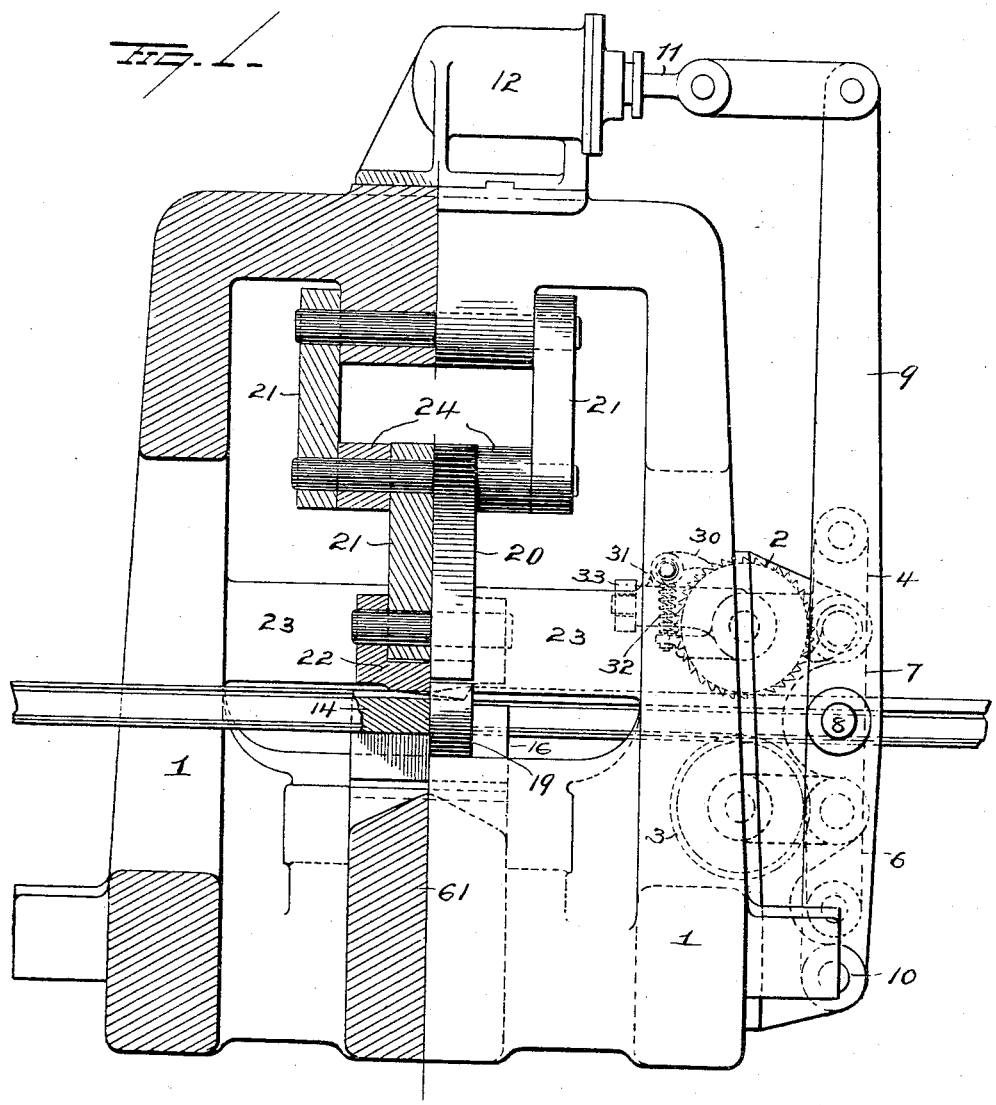
WITNESSES
INVENTOR

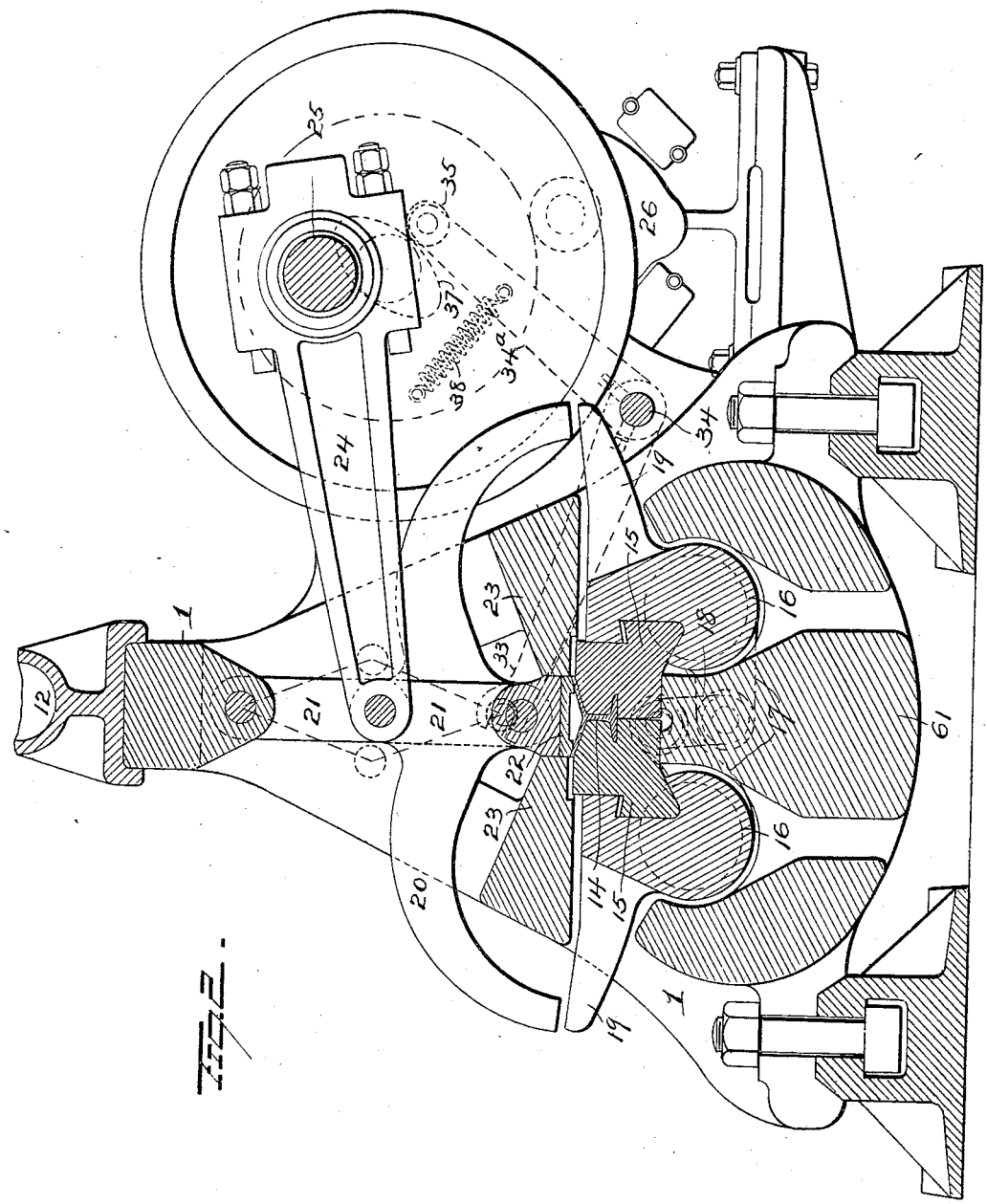

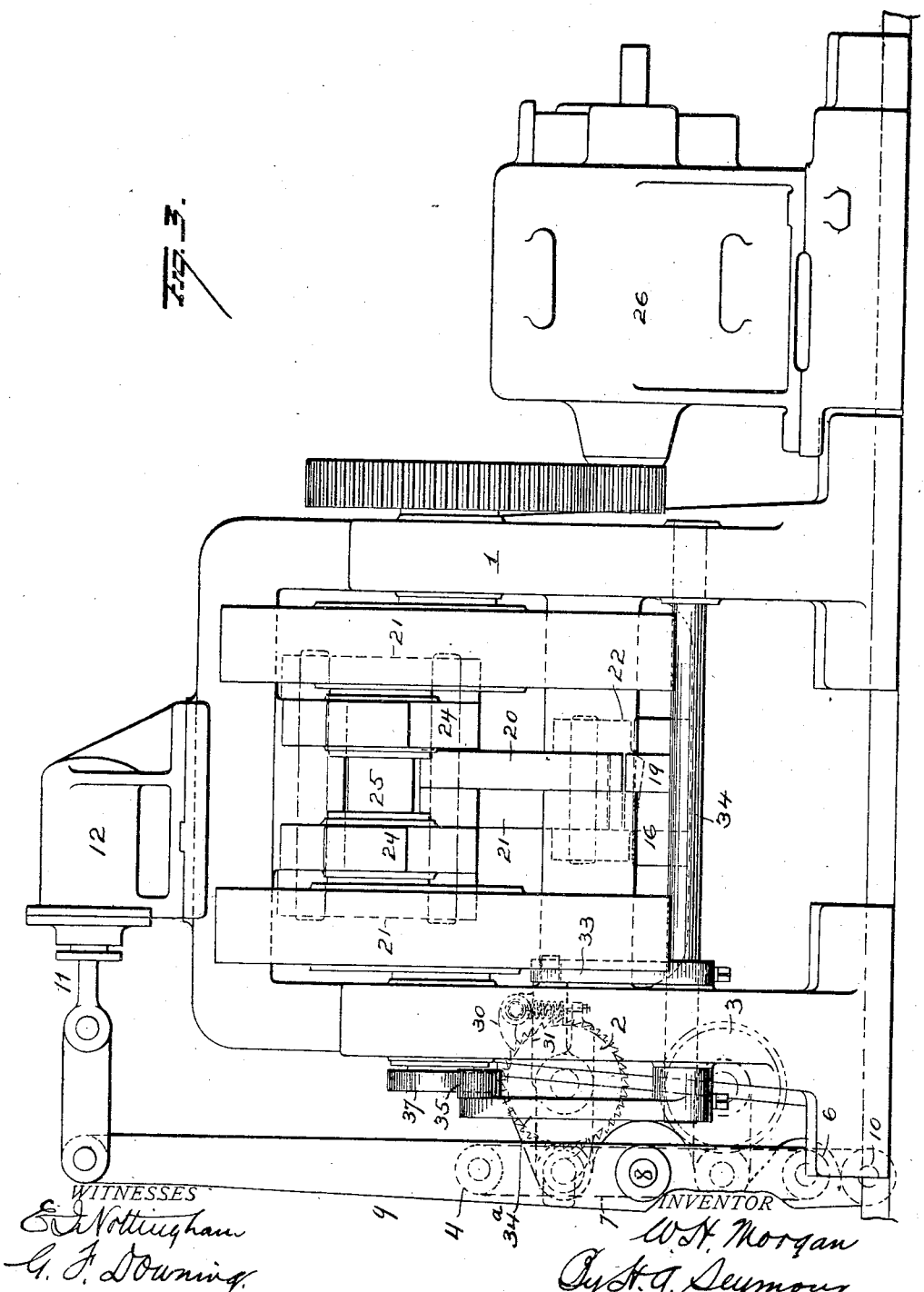

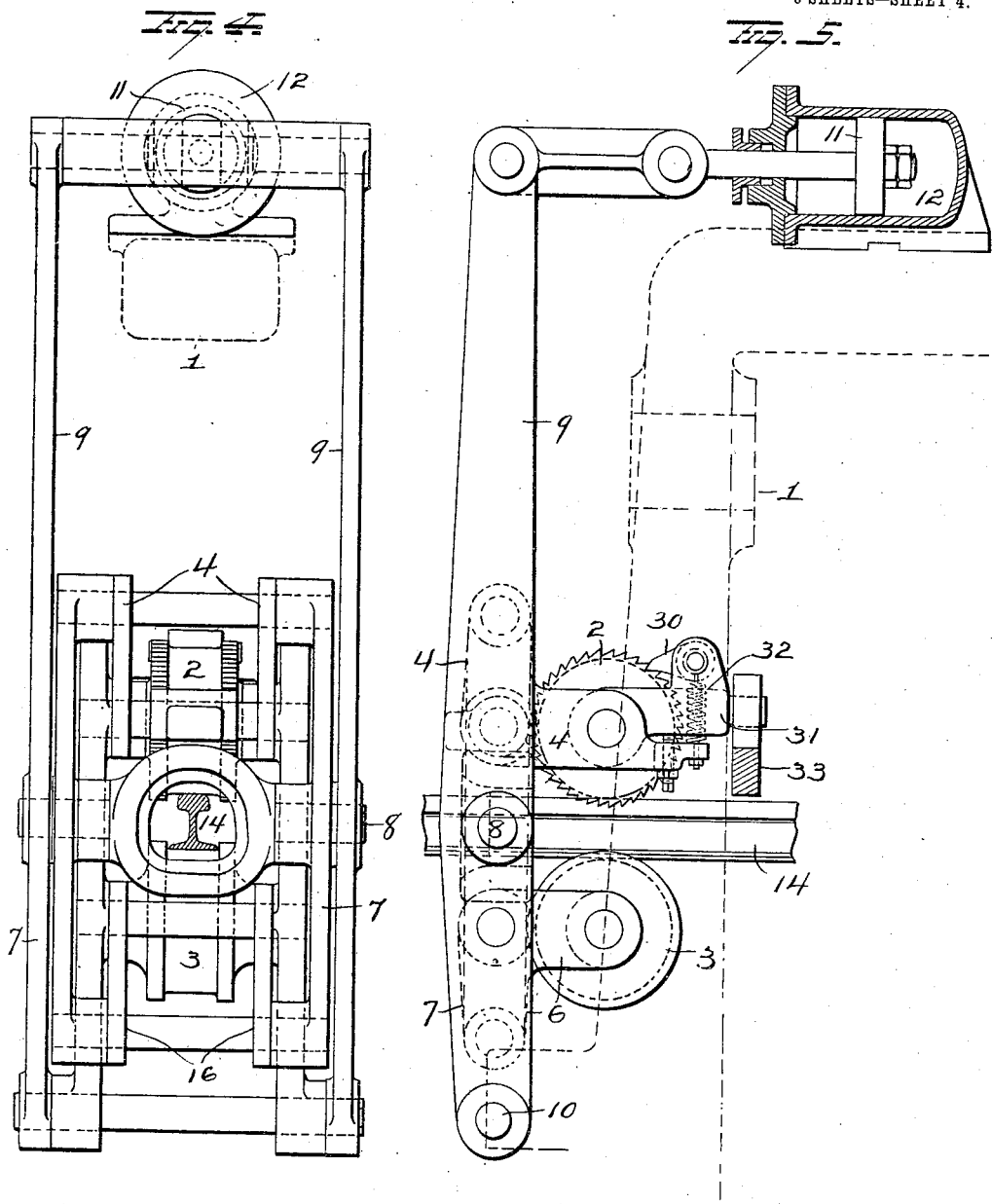

W. H. MORGAN.
APPARATUS FOR MAKING RAILROAD TIES FROM STEEL RAILS.
APPLICATION FILED JAN. 13, 1910.
968,874.
Patented Aug. 30, 1910.
6 SHEETS—SHEET 5.
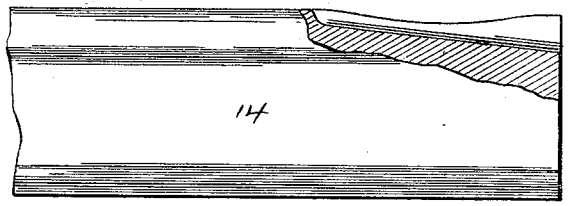
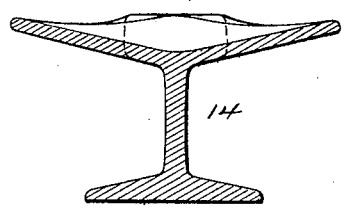
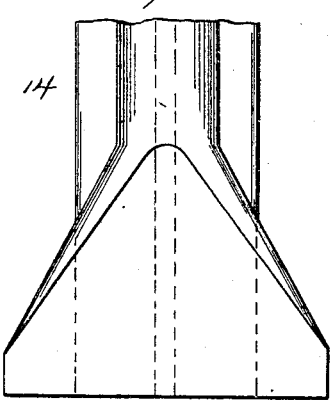
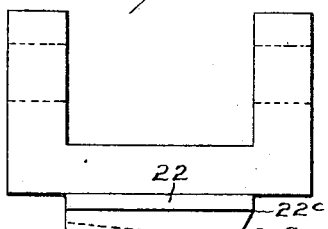
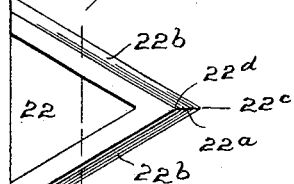
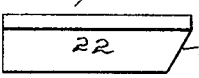

W. H. MORGAN.
APPARATUS FOR MAKING RAILROAD TIES FROM STEEL RAILS.
APPLICATION FILED JAN. 13, 1910.
968,874.
Patented Aug. 30, 1910.
6 SHEETS—SHEET 6.
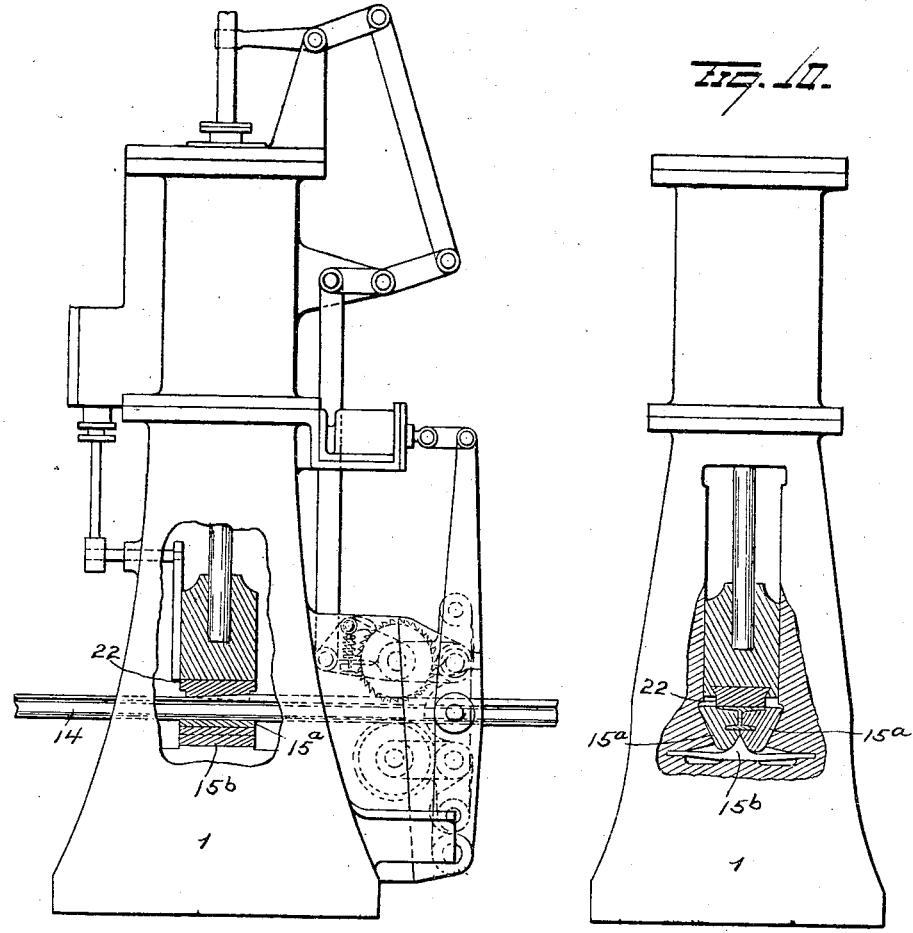
WITNESSES
INVENTOR
W. H. Morgan
Attorney

UNITED STATES PATENT OFFICE.

WILLIAM HENRY MORGAN, OF ALLIANCE, OHIO.

APPARATUS FOR MAKING RAILROAD-TIES FROM STEEL RAILS.

968,874.  Specification of Letters Patent.  Patented Aug. 30, 1910.

Application filed January 13, 1910. Serial No. 537,961.

*To all whom it may concern:*

Be it known that I, WILLIAM H. MORGAN, of Alliance, in the county of Stark and State of Ohio, have invented certain new and useful Improvements in Apparatus for Making Railroad-Ties from Steel Rails; and I do hereby declare the following to be a full, clear, and exact description of the invention, such as will enable others skilled in the art to which it appertains to make and use the same.

My invention relates to an improvement in apparatus for making railroad ties from steel rails, the object being to provide means for progressively feeding a rail longitudinally to an expanding device, which operates to swage or forge the head of the rail laterally into wide flanges which latter constitute the base of the tie.

With this and other objects in view my invention consists in feeding a hot rail longitudinally under a swaging or forging die whereby the head of the rail will be swaged and expanded laterally on both sides of the web.

My invention further consists in parts and combination of parts as will be hereinafter described and pointed out in the claims.

In the accompanying drawings, Figure 1 is a view partly in elevation and partly in section looking toward the front of the machine. Fig. 2 is a view in transverse vertical section of same. Fig. 3 is a view in rear elevation. Figs. 4 and 5 are views of the feeding mechanism. Fig. 6 is a view of a section of a rail with its head partly swaged or forged. Fig. 7 is a view in section through the expanded portion of the partly expanded rail of Fig. 6. Fig. 8 is a plan view of Fig. 6. Figs. 9 and 10 are views of a modified apparatus for swaging the rail and Figs. 11, 12 and 13 are views of the upper die.

1 represents the frame or housing of the machine, and 2 and 3 the rolls, for feeding the rail in a step by step movement to the forging or swaging die. The roll 2 is journaled at one side in a bell crank lever 4 mounted at its elbow in fixed bearing carried by the housing 1, and roll 3 is likewise supported on bell crank lever 6 mounted on a fixed bearing carried by the housing. The two bell crank levers 4 and 6 are pivotally connected to the ends of lever 7, which latter is mounted at its center at 8 on the lever 9 journaled at one end on fixed bearing 10, and connected at its opposite end to the piston 11 of hydraulic cylinder 12. The opposite sides of the rolls 2 and 3 are similarly supported and connected to the piston 11. I have however, in Fig. 4, shown the levers at one side of the feed rolls, the lever at the opposite side being simply a duplication of those shown. As the piston is forced inwardly the two sets of bell cranks 4 and 6 will be turned on their bearings thus forcing the feed wheel into contact with the rail section 14.

The upper roll 2 is positively actuated as will be hereinafter described to feed the rail section 14 progressively, or step by step into or between the dies 15, secured to the die carriers 16 mounted to rock in the housing 1, and each die carrier is provided with an inwardly projecting arm 17 as shown in Fig. 2, connected by a link 18, whereby they are caused to rock in unison, and each is also provided with an upwardly and outwardly projecting horn 19, which is engaged by the curved arm 20 on the toggle levers 21, for rocking the die holders and the dies 15 carried by the holders. These holders are slotted to receive the dies, and the two dies are shaped to receive the lower flange and web of the rail 14 as clearly shown in Fig. 2. When the dies are closed onto the rail, they rest on the anvil 61, and are supported thereby, while the swaging or forging die 22 is in contact with the head of the rail. The rail is pushed or drawn from a furnace into engagement with the feed rolls 2 and 3, and is fed by the latter progressively or step by step into and through the dies 15, and under and into a position where the head of the hot rail will be acted upon by the reciprocating upper forging or swaging die 22. This upper die is triangular in plan and is provided at its front end with a downwardly beveled nose 22ª, and with downwardly and inwardly beveled sides 22ᵇ. Its under side may be flat or unbroken throughout its area, but I prefer to cut it away at its center and rear as shown. Its lower face may also be horizontal or parallel with the lower dies, but I prefer to make it deeper at its front end or nose 22ª, with gradual upper inclination toward the rear end, so as to produce a wide flange concaved as shown in Figs. 6, 7 and 8. This die 22 is carried by toggle levers 21, and reciprocates between the guides 23 formed integral with the housing 1. The toggle levers are suspended from the top of the housing and are connected by pitmen 24 with the crank shaft 25 of motor 26.

The die 22 is located with the point of its nose 22$^a$ in the vertical plane of the web of the rail being operated upon; it is reciprocated vertically by the pitman 24 and toggle levers 21, and is guided in its vertical movements, and held in its proper position relative to the lower dies, by the guides 23.

At each movement of the pitman 24, the forging die 22 will be raised and forced down into contact with the head of the hot rail. When elevated, the lower edge of the nose 22$^a$ of the die 22 will be in a plane below the top surface of the head of the rail, and in feeding the rail 14, the distance the rail 14 moves at each feed, is preferably less than the distance between the upper end 22$^c$ and lower end 22$^d$ of the nose, so that the top surface of the head of the rail will always be engaged by the inclined edge 22$^a$.

As the rail 14 approaches the die 22, the inclined nose 22$^a$ of the triangular shaped die 22 engages the end thereof, and by its shape furrows or cuts into and spreads the head laterally. Between the successive strokes of the die 22 the rail is fed toward the latter, the amount of feed being, as previously stated, not greater than the distance between the point 22$^c$ and the lower edge 22$^d$, so that the furrow made by one stroke of the die will be elongated by the next, and the lower edge of the nose always be within the vertical plane of the furrow or depression formed by the preceding blow of the die 22. The sides of the die 22 are also inclined as at 22$^b$ hence as the rail is fed forwardly, the metal constituting the head will be gradually swaged and laterally expanded until it fills the forms in dies 15, and as the die is thicker or deeper at its front or nose end, than at its rear end, the upper surface of the expanded flange will be trough shaped as shown in Fig. 7. This movement of the rail between the dies 15 and under die 22, is a progressive or step by step movement, the feed being first against the inclined nose 22$^a$ which makes the initial depression or cut in the head of the rail and as this depressed portion is moved under the die, it is gradually expanded until it fills or approximately fills the depressions in dies 15.

The lower face of the die 22 may be solid or unbroken but in order to minimize power for actuating same, I prefer to cut away the central and rear portions of the lower face of the die, thus leaving a V-shape surface, which, experiment has demonstrated is sufficient for the purpose.

The feed roll 2 is provided with a toothed periphery which is engaged by pawl 30 pivotally on the lever 31. This lever is mounted on the feed wheel shaft and is held downwardly by the spring 32. The outer end of lever 31 rests within slot 32 in the lever arm 33. This arm 33 is secured to the rock shaft 34 journaled in the housing 1 and carrying the arm 34$^a$ provided at its upper end with a roller 35 which latter rests in contact with the cam 37 secured to one end of the crank shaft 25. Arm 35 is held in contact with the cam 37 by spring 38, and at each half revolution of the crank shaft 25, the cam 37 forces the arm 35 down and the arm 33 up thus elevating the lever 31 so that with each upward movement of the arm 33 the pawls of the upper feed rolls will be moved to turn said wheel the proper feeding distance which may be regulated. The feeding movement of the rail occurs during the upward stroke of the upper die, and while the latter is out of contact with the rail.

The horns 19 of the die carriers 16, rest adjacent to the free ends of the arms 20, which as previously explained are carried by the toggle levers 21. As shown they are secured to the lower members of said levers, and may be integral with or secured to the same so as to move in unison therewith. As the toggle levers are moved to the opposite sides of the vertical center, they depress one arm 20 and elevate the other. The arm depressed contacts with the horn immediately under same, thus turning its die carrier on its axis, and as the two die carriers are connected, they are simultaneously turned in a direction to release the rail, which remains free, until released by the movement of the toggle levers in the opposite direction. It is during this period, while the rail is free from the dies, that the rail is fed forwardly.

With this apparatus I take old worn rails, heat them and by forging and expanding the head laterally so as to form side flanges, I produce a tie which is structurally as strong as the rail from which it was made. In use the expanded head of the rail becomes the base of the tie, the base of the rail forming the bearing surfaces for the rails.

With this apparatus the clamping dies and expanding die are short as compared with the rail, and as the latter is fed endwise under the forging die, it will be seen that any length of rail may be reworked thus producing ties of any length.

While I have referred to the reworking of old rails to produce ties, it will be evident that other shapes comprising a web and an enlarged head may be used in lieu of rails, hence I would have it understood, that all reference to rails in the specification is intended to comprehend and include any shape or structure having a web and an enlarged portion at one edge thereof.

In the construction shown in Figs. 9 and 10 I have connected the forging die to the piston of an hydraulic apparatus, and connected the feed rolls to the piston of the apparatus, by the mechanism shown whereby they are operated in sequence. In this modification I have mounted the lower dies 15ª on a heavy spring 15ᵇ seated at its ends in recesses in the base of the apparatus, the spring having an upwardly projecting portion which rests between the dies 15ª and prevents lateral movement thereof.

With this construction, when the upper die is out of contact with the rail, the spring 15ᵇ elevates the two dies 15ª, and as the latter are mounted on inclined ways or supports, they separate and release the rail. As the upper die 22 engages the rail it first depresses it and the dies 15ª and spring 15ᵇ, until the latter is firmly seated on the frame of the apparatus, after which it operates in the manner previously described. The details of this modification are not herein claimed but are specifically reserved for a subsequent application. Neither do I claim specifically the means for actuating the lower dies nor the feeding device as they are shown and claimed in my application No. 520,857 filed October 4th, 1909.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. In apparatus for forging an elongated section having a web and an enlarged portion, the combination of a device adapted to support the enlarged portion and embrace the web portion, a device arranged to engage the enlarged portion and furrow and laterally expand same, means for reciprocating said expanding device in a plane approximately at right angles to the surface of the enlarged portion acted upon by said expanding device and means for progressively feeding the work piece to the expanding device.

2. In apparatus for forging an elongated section having a web and an enlarged portion, the combination of a device adapted to support the enlarged portion and embrace the web portion, a device arranged to engage the enlarged portion and furrow and laterally expand same means for reciprocating said expanding device in a plane approximately at right angles to the surface of the enlarged portion acted upon by said expanding device and means coöperating with the expanding device for feeding the work piece intermediate the periods the latter is engaged by the expanding device.

3. Means for supporting an elongated section, means for engaging the sides of said section and permitting a portion to project therefrom while thus supported, a reciprocating die adapted to engage said projecting portion, the said die constructed to produce a furrow and laterally expand the furrowed portion, and means adapted to feed the section intermediate the periods the latter is engaged by the furrowing and expanding device, the said feeding means adapted to feed in a step by step movement, and maintain the same relation to the work during the expanding operation.

4. In apparatus for forging an elongated section having a web and an enlarged portion, the combination of two dies adapted to support the enlarged portion and engage the sides of the web portion, a reciprocating die having a pointed end inclined downwardly and rearwardly, adapted to engage the enlarged portion for laterally expanding same, and means for feeding the work piece longitudinally toward the laterally expanding die.

5. In apparatus for forging a longitudinal section having a web and an enlarged portion, the combination of two dies adapted to support the enlarged portion and engage the sides of the web portion, a reciprocating die triangular in elevation, its pointed end or nose portion being downwardly and rearwardly inclined, and its lower face rearwardly and upwardly inclined, means for reciprocating said die, and means for feeding the work piece longitudinally toward the nose of the reciprocating die.

In testimony whereof, I have signed this specification in the presence of two subscribing witnesses.

WILLIAM HENRY MORGAN.

Witnesses:
N. C. Fetters,
C. R. Richards.